(12) United States Patent
Challenger et al.

(10) Patent No.: US 7,908,437 B2
(45) Date of Patent: *Mar. 15, 2011

(54) METHOD AND SYSTEM FOR EFFICIENT FRAGMENT CACHING

(75) Inventors: James Robert Harold Challenger, Garrison, NY (US); Louis Ralph Degenaro, White Plains, NY (US); Robert Filepp, Westport, CT (US); Arun Kwangil Iyengar, Yorktown Heights, NY (US); Richard Pervin King, Scarsdale, NY (US)

(73) Assignee: International Busines Machines Corporation, Armonk, NY (US)

( * ) Notice: Subject to any disclaimer, the term of this patent is extended or adjusted under 35 U.S.C. 154(b) by 256 days.

This patent is subject to a terminal disclaimer.

(21) Appl. No.: 12/131,180

(22) Filed: Jun. 2, 2008

(65) Prior Publication Data

US 2008/0229019 A1    Sep. 18, 2008

Related U.S. Application Data

(60) Continuation of application No. 11/502,213, filed on Aug. 10, 2006, now Pat. No. 7,574,563, which is a division of application No. 10/622,209, filed on Jul. 18, 2003, now Pat. No. 7,114,032.

(51) Int. Cl.
*G06F 12/00* (2006.01)
*G06F 13/00* (2006.01)

(52) U.S. Cl. ......... 711/118; 711/100; 711/154; 709/203

(58) Field of Classification Search .................. 711/100, 711/118, 154; 703/1; 709/203
See application file for complete search history.

(56) References Cited

U.S. PATENT DOCUMENTS 5,481,473 A * 1/1996 Kim et al. .................... 716/5
5,528,508 A * 6/1996 Russell et al. ................ 716/8

* cited by examiner

*Primary Examiner* — Tuan V. Thai
(74) *Attorney, Agent, or Firm* — Tutunjian & Bitetto, P.C.; Preston J. Young, Esq.

(57) ABSTRACT

Methods for serving data include maintaining an incomplete version of an object at a server and at least one fragment at the server. In response to a request for the object from a client, the incomplete version of the object, an identifier for a fragment comprising a portion of the objects and a position for the fragment within the object are sent to the client. After receiving the incomplete version of the object, the identifier, and the position, the client requests the fragment from the server using the identifier. The object is constructed by including the fragment in the incomplete version of the object in a location specified by the position.

16 Claims, 6 Drawing Sheets

METHOD AND SYSTEM FOR EFFICIENT FRAGMENT CACHING

RELATED APPLICATION INFORMATION

This application is a Continuation application of U.S. patent application Ser. No. 11/502,213 filed on Aug. 10, 2006 now U.S. Pat. No. 7,574,563, (which is incorporated by reference herein in its entirety), which is a Divisional application of allowed U.S. patent application Ser. No. 10/622,209 filed on Jul. 18, 2003, now U.S. Pat. No. 7,114,032, issued on Sep. 26, 2006.

BACKGROUND OF THE INVENTION

1. Field of the Invention

The present invention relates to distributed systems, and more particularly to a system and method for fragment caching in distributed systems.

2. Description of the Related Art

Caching is an important technique for improving the performance of distributed systems, including Web-based systems. A significant problem with caching is that not all data are cacheable. Data, which is dynamic and changes quickly, or personalized data, in which a Web page is tailored to a specific user, may not be cacheable. Such a Web page may not be usable by other clients (e.g., it may include the name of a specific user). Therefore, caching a page may be of limited utility since other clients cannot use it, and other clients would need a different version of the page.

Other concerns include widespread changes that need to be made to update Web pages. Suppose, for example, that a particular fragment is contained in 2000 popular Web pages, which should be cached. Using the conventional approach, the cache would contain a separate version of the fragment for each page, resulting in as many as 2000 copies. This becomes burdensome and expensive.

Therefore, a need exists for a system and method for more efficiently updating information in distributed information systems.

SUMMARY OF THE INVENTION

Methods for serving data, in accordance with the present invention, include maintaining an incomplete version of an object at a server and at least one fragment at the server. In response to a request for the object from a client, the incomplete version of the object, an identifier for a fragment comprising a portion of the object, and a position for the fragment within the object are sent to the client. After receiving the incomplete version of the object, the identifier, and the position, the client requests the fragment from the server using the identifier. The object is constructed by including the fragment in the incomplete version of the object in a location specified by the position.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

One method, which avoids the need for updating entire data objects or large portions of data objects, is to compose complex data objects (e.g. Web pages) from simpler fragments. To efficiently serve the data, a cache stores the fragments and composes them into complete entities. A fragment may recursively embed other fragments. The fragment approach is efficient because the overhead for assembling a Web page from simpler fragments is usually minor compared to the overhead for constructing the page from scratch, which can be quite high.

In accordance with the present invention, fragment-based Web page generation and caching has a number of advantages. To employ fragments to permit partial caching of personalized pages, the personalized information on a Web page is encapsulated by one or more fragments that are not cacheable, but other fragments in the page are.

When serving a request, a cache composes pages from its constituent fragments, many of which are locally available. Personalized fragments have to be created by the server. As personalized fragments may only constitute a small fraction of the entire page, generating only the personalized fragments would require lower overhead than generating all of the fragments in the page.

The fragment-based approach also makes it easier to design Web sites. Common information that needs to be included on multiple Web pages can be created as a fragment. To change the information on all pages, only the fragment needs to be changed. Generating Web pages from fragments provides other benefits as well. When a particular fragment changes but the rest of the Web page stays the same, only the fragment needs to be invalidated or updated in the cache, not the entire page. Fragments can also reduce the amount of cache space taken up by multiple pages with common content.

If the fragment-based method of page composition is used, only a single copy of the fragment needs to be maintained. Fragments can be constructed to represent entities that have similar lifetimes. Fragment caching is advantageous when different parts of the same Web page have different lifetimes. If such pages can be broken down into fragments based on expected lifetimes, then when part of a page changes, it may only be necessary to fetch one or a few fragments instead of the whole page.

Fragment caching also provides advantages for common information included across several pages. Such information can be cached in a single fragment as opposed to replicated in every cached page that includes the common information. For these situations, fragment caching reduces the amount of cached information and the amount of information sent from the server to the cache.

This invention disclosure describes a system and method for efficiently generating fragments at a server while encoding the proper information for a remote cache to efficiently compose a complete entity from fragments. Some aspects of the present invention include the information generated by the server, the communications protocol between the server and cache, and fragment assembly at the cache.

The present invention will illustratively be described in the context of constructing HTML pages from fragments; however, the present invention may be applied to other types of data as well. The present invention is particularly applicable to the Web; however other systems, which use caches to improve performance, can benefit as well.

For Web-based caches, the HTTP protocol, as described in "Hypertext Transfer Protocol—HTTP/I.I", RFC 2626, R. Fielding et Al., June 1999, may be used. The HTTP protocol defines a number of header fields, which are convenient for storing caching information used in accordance with the present invention. HTTP headers will illustratively be used by the present invention. It should be recognized that other methods and other protocols other than HTTP may be employed within the spirit and scope of the invention.

It should be understood that the elements shown in the FIGS. may be implemented in various forms of hardware, software or combinations thereof. Preferably, these elements are implemented in software on one or more appropriately programmed general-purpose digital computers having a processor and memory and input/output interfaces. Referring now to the drawings in which like numerals represent the same or similar elements and initially to FIG. 1, a set of Web pages, P1, P2, and P3, are depicted in which P1 and P2 include several fragments.

Figure 1:
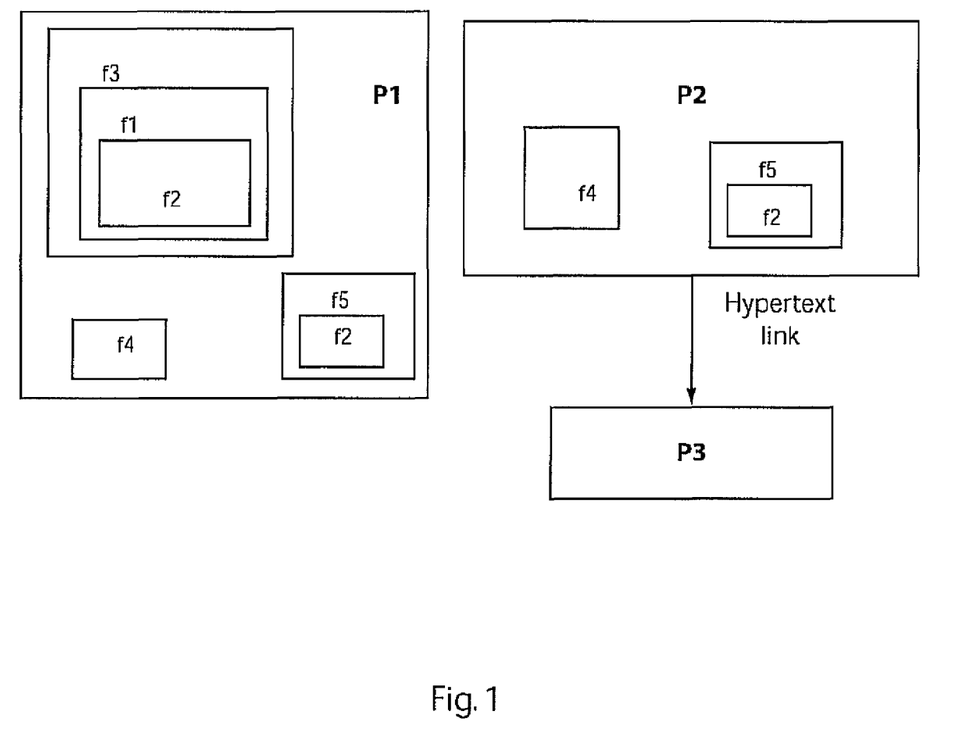
FIG. 1 is a block diagram showing relationships between embedded fragments and pages for illustrating the present invention.

P1 includes a plurality of fragments f1-f5. Some fragments are embedded in others and are depicted graphically as one fragment box inside of another, e.g., f2 is embedded in f5, f2 is also embedded in f1 which is embedded in f3. P2 includes fragments f2, f4 and f5 where f2 is embedded in f5. These pages and fragments will be referred to throughout this disclosure to illustrate aspects of the present invention.

Figure 2:
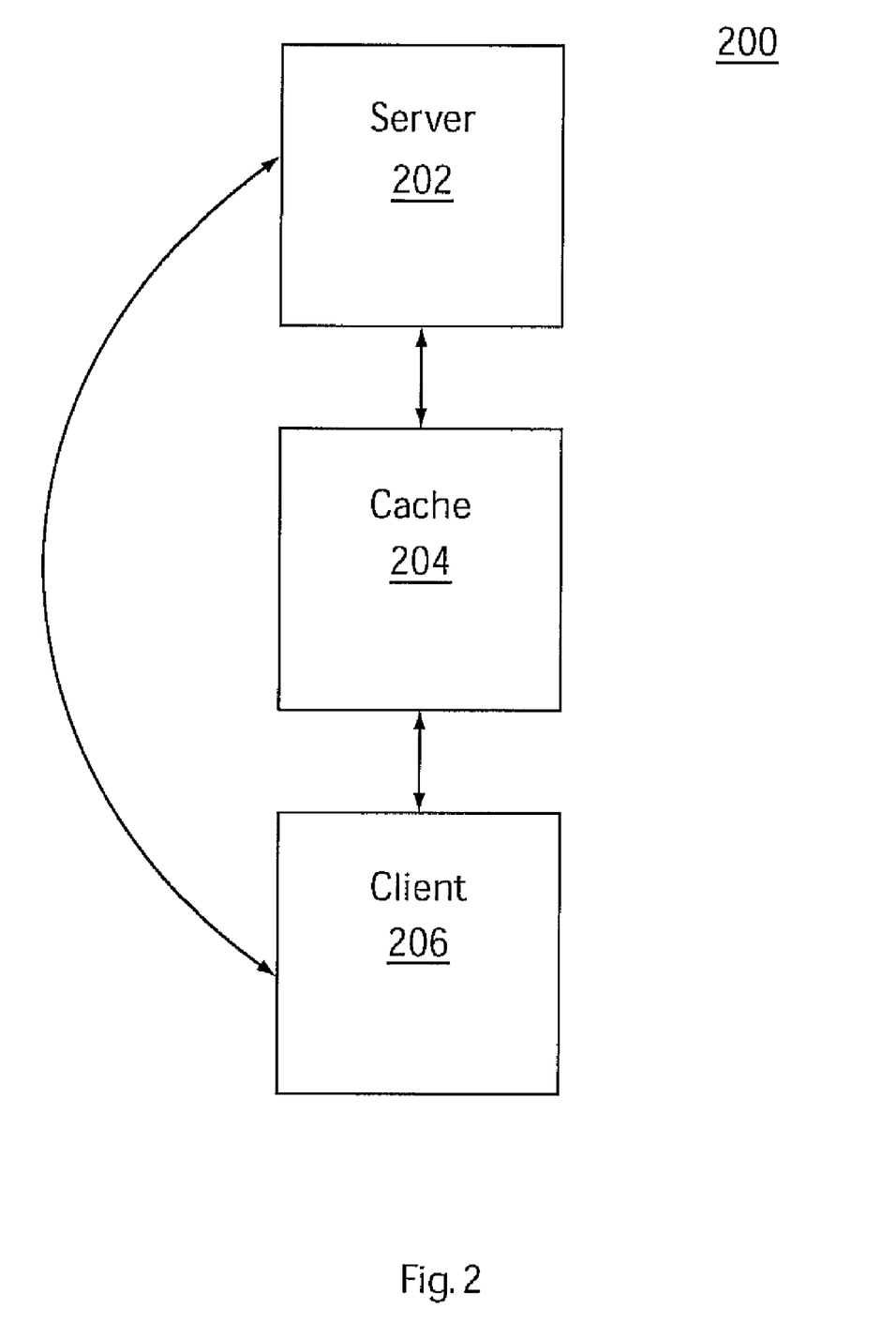
FIG. 2 is a block diagram showing a client server system in accordance with one embodiment of the present invention.

Referring now to FIG. 2, a client-server system 200, which employs the present invention, is illustratively shown. While the system 200 depicts a single server 202, cache 204, and client 206, the system 200 may include a plurality of each of servers 202, caches 204, or clients 206. The arrows in the figure depict network communication paths between the entities. It is also possible to have direct network communication paths between the server 202 and client 206.

Note that the server 202 may comprise additional entities other than a Web server. For example, server 202 may also include additional back-end computers with databases, transaction processing capabilities, etc. Many Web sites include complex back-end processing systems, and server 202 may include such systems.

Server 202 has the capability of generating Web pages from fragments. A system for generating complex Web pages from fragments is disclosed in "A Publishing System for Efficiently Generating Dynamic Web Content" by Challenger, Iyengar, Witting, Ferstat, and Reed, Proceedings of INFOCOM 2000.

Cache 204 may store either complete Web pages or fragments of Web pages. In some situations, server 202 may have the ability to explicitly store information in cache 204. In other situations, client 206 requests an object from cache 204. In the event that the object is not found in cache 204, cache 204 requests the object from server 202.

Cache 204 may store some objects but not others. Server 202 may provide information indicating whether an object should be cached. If a cache and server are communicating using HTTP, for example, then there are methods within the HTTP protocol to specify whether or not an object should be cached.

Objects may have expiration times associated with them. An expiration time indicates when a cached object is no longer current. After the expiration time for an object has expired, cache 204 should not serve an object without first checking with a server 202 that the object is still valid.

Some systems may also have the ability for server 202 to send information to cache 204 that a cached object is no longer valid. Fragments may be cached remotely either by being pushed from a server or on a cache miss during a request for an object by a client.

When server 202 receives a request for an object, which includes fragments (e.g. a top-level HTML page), it may determine if the request is coming from a cache 204, which recognizes fragments. If the server and cache are using a protocol such as HTTP, this information could be stored in headers. Caches, which recognize fragments, may indicate this in a request header. If cache 204 recognizes fragments, server 202 can send an incomplete version of the object including the object minus its embedded fragments. For top-level fragments included in the object, server 202 sends back an identifier 302 (FIG. 3) identifying the fragment (for Web fragments, this could be similar to a uniform resource locator (URL)) along with a position 304 (FIG. 3) indicating the position of the fragment within the incomplete version of the object. Positions 304 may be specified in several ways, including but not limited to offsets within the incomplete version of the object. Fragments may recursively embed other fragments. If a protocol such as HTTP is being used, identifiers 302 and positions 304 may be transmitted in header fields.

If server 202 determines that cache 204 does not recognize fragments, the server 202 can send the complete object (which may be, for example, a complete HTML page) to the cache. To reduce object assembly overhead, it is possible to pre-assemble complete objects at the server in advance and maintain both the complete objects and incomplete versions with fragments at the server. This has the drawback of occupying more memory space. It may also introduce consistency problems for objects, which are frequently updated.

Figure 3:
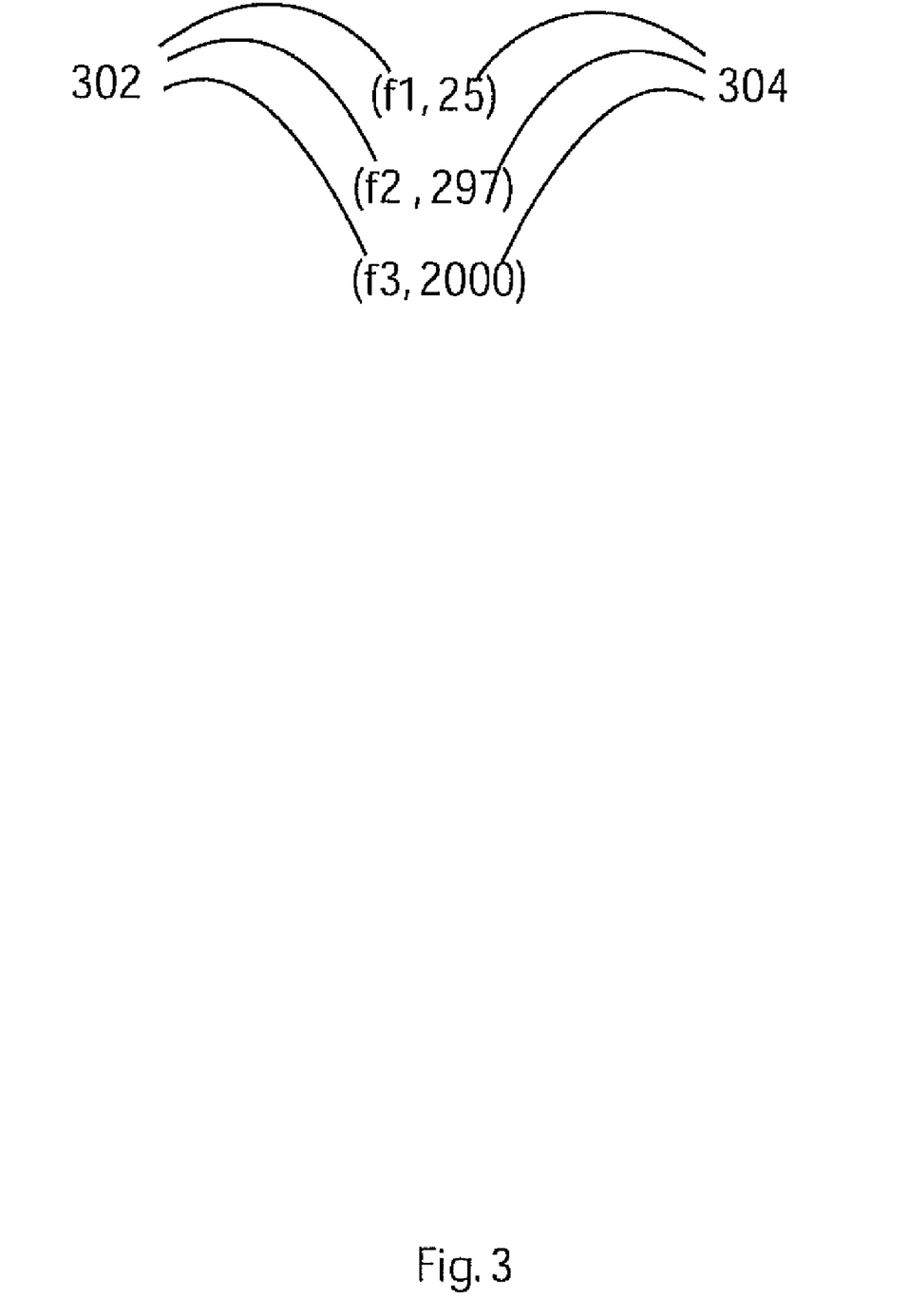
FIG. 3 is an illustrative list of identifiers and positions employed in accordance with the present invention.

When server 202 receives from a cache 204 a request for an object, which is a fragment, included in another object, it is safe for the server to assume that the cache understands fragments. The server can respond to the cache with the fragment along with identifiers 302 and positions 304 for any fragments recursively embedded within the served fragment.

Suppose that a client 206 requests an object P1 composed of fragments. The request goes to cache 204, which recognizes fragments but which currently does not include P1. The request is sent from the cache 204 to the server 202. The cache 204 may indicate to the server (using a request header, for example) that the cache recognizes fragments. Instead of passing P1 in its entirety to the cache 204 (which it would likely do if the request were from a cache which did not recognize fragments), the server 202 sends P1', a stripped down version of P1 minus 1 or more fragments, to the cache 204. Identifier(s) 302 and position(s) 304 are also sent to the cache corresponding to the one or more fragments not in P1'. These fragments are preferably at the top level, e.g., they should be directly embedded in P1'. For fragments which should be recursively embedded within a higher level fragment in P1' but not directly embedded in P1' it is not necessary to pass identifier/position information.

P1' may be cached. To cache P1', identifiers 302 and positions 304 corresponding to fragments which should be embedded at top level in P1 are stored in the cache, preferably but not necessarily ordered by position. When cache 204 is called upon to serve P1, cache 204 obtains each fragment f which needs to be embedded in P1' to result in P1. Some of these fragments may already be cached. Other fragments (e.g., highly dynamic or personalized fragments) may have to be fetched from a remote server. Different fragments may have to be obtained from different servers.

For each top-level fragment f embedded in P1, f is fetched either by accessing f from cache or by fetching f from a remote server. If f is fetched from a remote server, specific information from a particular client may be passed to the server 202 to permit, for example, creation of a personalized fragment. One method of sending such information for Web-based system is via cookies.

Fragment f may recursively include other fragments. Persistent connections may be used to fetch multiple fragments from the same server in a single connection. For fragments on different servers without open connections to a cache, the cache may either fetch the fragments serially or in parallel using multiple threads. If multithreading is used to fetch multiple fragments in parallel, buffering may be needed to receive the fragments.

The cache 204 may begin responding to the client 206 immediately by sending parts of P1 which cache 204 has already stored. If fragments are being fetched serially, the cache may repeatedly serve data until the cache 204 reaches a position corresponding to the next unserved fragment. At this stage, the cache 204 checks whether the fragment is cached. If so, it obtains the fragment from cache. Otherwise, cache 204 requests the fragment from a server.

Separating references to fragments from the body of P1 eliminates the need for cache 204 to parse the body of P1 and improves the performance of the cache. This is illustrated in FIG. 4.

Figure 4:
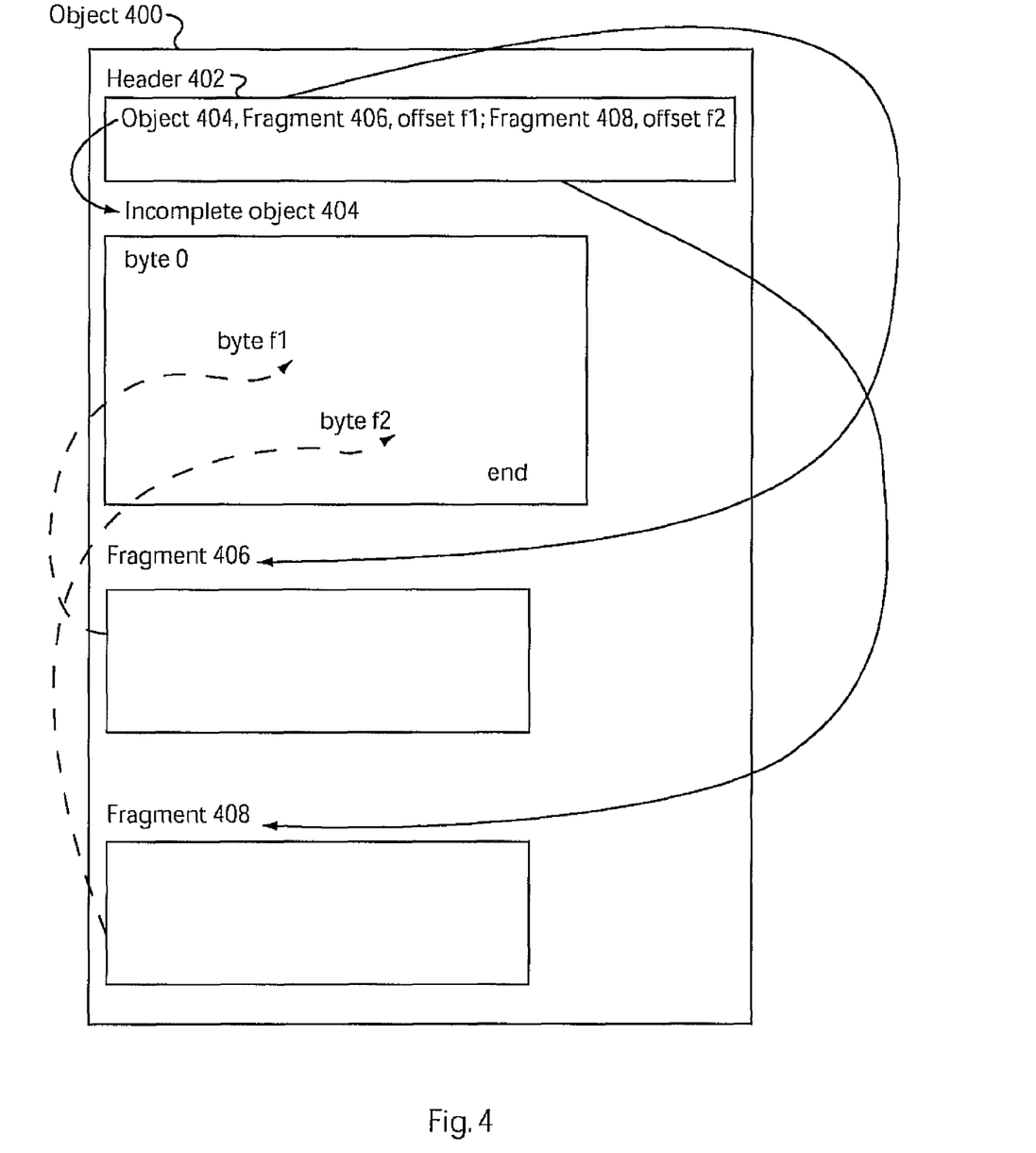
FIG. 4 is a diagram showing a Web page or other complex object, which employs a header and includes incomplete objects and fragments in accordance with the present invention.

Referring to FIG. 4, header information 402 describes the component and position information to formulate a complete object 400 by utilizing incomplete object 404, inserting Fragment 406 at position f1, and inserting Fragment 408 at position f2.

Figure 5:
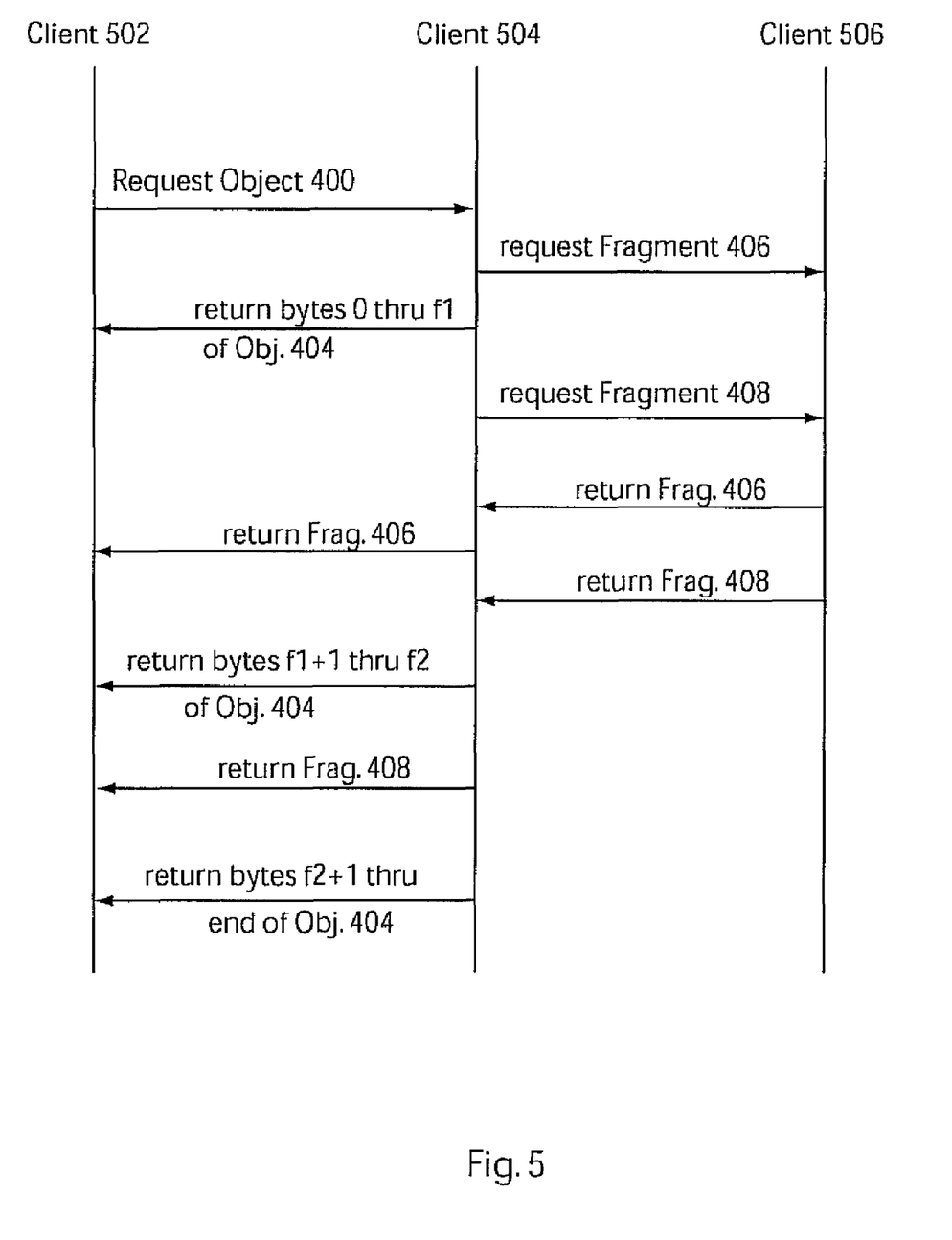
FIG. 5 depicts a message flow scenario in which header and incomplete objects are cached, while fragments are retrieved from a server.

FIG. 5 illustrates one possible flow of messages between client, cache, and server to achieve the delivery of the complete object 400, comprising incomplete object 404 and its associated fragments 406 and 408, to the client.

Referring to FIG. 5, client 502 requests object 400 from cache 504. In this scenario, cache 504 has both header information 402 and incomplete object 404 stored locally, while fragments 406 and 408 are not stored locally. Cache 504 determines that fragments 406 and 408 need to be requested from server 506 and issues those requests. Cache 504 then delivers bytes 0 through f1-1 (as specified in header 402) of object 404 to client 502.

When fragment 406 is returned by server 506, the cache 504 delivers fragment 406 to client 502. Cache 504 then delivers bytes f1 through f2-1 of incomplete object 404 to client 502. When these bytes have been sent, cache 504 delivers fragment 408 to client 502. When delivery of fragment 408 is complete, cache 504 delivers the remaining bytes of incomplete object 404 to client 502. The serving process for fragments is recursive, since a fragment may recursively embed other fragments. The cache may use a maximum time limit for fetching a fragment. Once the time limit has expired, the cache will not try to waste additional resources fetching other fragments in the object. It will instead complete sending what information it can to the client quickly and/or respond with an error message.

One problem, which can occur in fragment assembly, is when the specification of fragment relationships erroneously specifies a cycle in inclusion relationships. For example, suppose that an entity erroneously specifies that f1 includes f2, which includes f1. If a system attempts to construct f1 without trying to detect cycles, it may enter into an infinite loop. This may be prevented using multiple methods. If a particular fragment f1 is included in an object, an embedding depth of the fragment may be defined as the number of inclusion relationships used to define the object's position in the object.

For example, consider FIG. 1, within objects P1 and P2, fragment f4 has an embedding depth of 1, since f4 is included within P1 and P2 but no intermediate fragments also within P1 and P2 also include f4. Similarly, f5 has an embedding depth of 1. Fragment f1 has an embedding depth of 2 within P1 because f1 is included in f3, which is itself included in P1. One occurrence of f2 within P1 has an embedding depth of 3, i.e., the one in which f2 is included in f1, which is included in f3, which is included in P1. A second occurrence of f2 has an embedding depth of 2, e.g., where f2 is included in f5, which is included in P1.

Under one method, the system uses a maximum embedding depth or threshold, m. Different maximum embedding depths may be specified for different fragments. If the system encounters a fragment with an embedding depth exceeding m, it can flag this as an error and return an appropriate error message and/or send a partially constructed version of the page without fragments embedded at levels beyond m.

Another method is to maintain a list of fragment identifiers corresponding to the inclusion relationships. A hash table can be used for storing the identifiers. Each time the list of inclusion relationships increases by a fragment, the hash table is examined to see if the fragment has already been encountered in the list. If so, it is concluded that a cycle exists. If not, the fragment identifier is added to the hash table, and the process continues. Once the recursive process of dealing with a particular fragment is complete, that fragment may be removed from the hash table. This avoids the mistaken impression that there is a cycle when there is actually just multiple inclusion of a fragment, as in, for example, FIG. 1, with f2 included twice in P1. Without removal of f2 when processing of its inclusion in f1 completed, f2 may still be in the hash table when its inclusion in f5 was processed. That may lead to the mistaken impression that there was a cycle, which is one reason that earlier removal is desirable. Other data structures can be used (e.g. ordered lists, balanced trees) in place of a hash table in this approach. Hash tables have the advantage that they can be designed to be efficient. Note that this approach can be combined with maximum embedding depth thresholds. For example, if the length of the list exceeds a maximum embedding depth threshold, the system may stop trying to look for a cycle, even if none has yet been detected.

Graph traversal algorithms may also be applied to detect cycles in inclusion relationships. For example, fragments can be represented by vertices in a directed graph, and inclusion relationships can be represented by directed edges in the graph. To determine if there is a cycle in a list of inclusion relationships, a number of techniques can be used which do not need to employ auxiliary data structures such as hash tables.

One such technique includes the following. The list of inclusion relationships is traversed using two pointers. One pointer traverses one fragment at a time. The second pointer traverses two fragments at a time. If the two pointers eventually meet, then a cycle has been detected. Graph traversal algorithms such as these do not have to be applied after each new inclusion relationship is encountered. Instead, the system can set a threshold and not apply the cycle detection test until the number of inclusion relationships has reached the threshold.

If the threshold has been reached and the cycle detection algorithm fails to detect a cycle, the system can increase the threshold and continue looking for cycles. This method can set an upper limit on the size of the threshold. In response to no cycle being detected after the upper limit is reached, the system can stop looking for a cycle.

Thresholds may be adaptively set to be just beyond the highest value of the embedding depth expected to be encountered.

Figure 6:
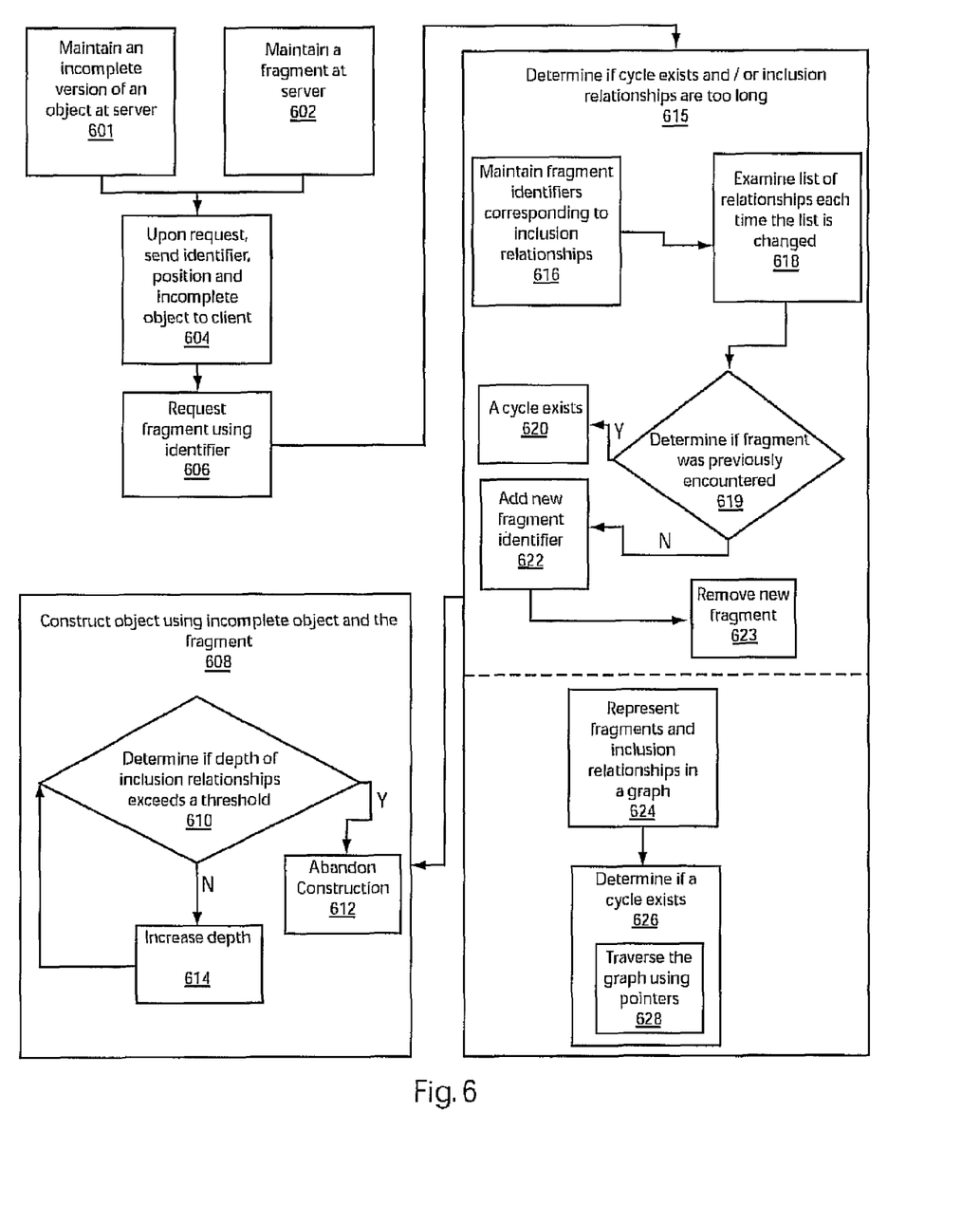
FIG. 6 is a block/flow diagram showing methods/systems for efficient fragment caching in accordance with the present invention.

Referring to FIG. 6, a method/system for serving data is depicted, which includes a method/system for determining if cycles exist in embedded fragment sets and/or inclusion relationships are too long in length (depth) with regard to a threshold. The system/method includes in block 602, maintaining an incomplete version of an object at a server and maintaining at least one fragment at the server. The incomplete version of the object and the fragment may be stored on a plurality of servers or on the same server. In addition, portions of the incomplete object and the fragment may be stored on a plurality of servers. In block 604, in response to a request for the object, such as a Web page, from a client (for example, a cache), the incomplete version of the object, an identifier for a fragment including the object, and a position for the fragment within the object are sent to the client. In block 606, after receiving the incomplete version of the object, the identifier, and the position, the fragment is requested by the client from the server using the identifier.

In block 608, the object is constructed by including the fragment in the incomplete version of the object in a location specified by the position. The step of constructing includes determining whether a depth of inclusion relationships in the object exceeds a threshold in block 610 and in response to the depth exceeding the threshold, abandoning constructing the object in block 612. In block 614, the threshold is increased and step 608 repeated until the object can be constructed, time expires or construction of the fragment is complete. Other actions may include, for example, simply sending an error message.

In block 615, a method/system for determining if cycles exist in inclusion relationships and/or if inclusion relationships of fragments are too long (exceeds a given depth) is shown. Several methods may be employed for making these determinations. Two methods are indicated in block 615 of FIG. 6 and are separated by a dashed line.

In block 616, a list of fragment identifiers corresponding to inclusion relationships may be maintained. The list of fragment identifiers may be included in a hash table. The hash table may be examined each time the inclusion relationships change in block 618.

In block 619, the list of inclusion relationships may be examined when the list of inclusion relationships increases by a new fragment to see if the new fragment has already been encountered in the list of inclusion relationships. In block 620, if the new fragment has already been encountered, it is concluded that a cycle exists; otherwise, the new fragment identifier is added to the hash table, in block 622. In block 623, the new fragment is removed when its time expires or construction of the fragment is complete.

In an alternate approach to blocks 616-623, in block 624, fragments may be represented by vertices in a directed graph, and inclusion relationships may be represented by directed edges in the graph. In block 626, it is determined if there is a cycle in a list of inclusion relationships. This may include traversing a list of inclusion relationships using two pointers, in block 628, wherein a first pointer traverses one fragment at a time, and a second pointer traverses two fragments at a time. If the two pointers meet in the graph, a cycle has been detected.

Having described preferred embodiments of a method and system for efficient fragment caching (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. In a system comprised of a plurality of fragments in which a fragment is includable in another fragment, a method for determining whether a set of inclusion relationships includes a cycle, comprising the steps of:
   examining the set of inclusion relationships to determine whether a depth of inclusions exceeds or equals a threshold;
   if the depth exceeds or equals the threshold, using graph traversal techniques to determine if a graph comprised of inclusion relationships includes a cycle; and
   if, using the graph traversal techniques, no cycle is determined, incrementing the threshold and returning to the step of examining.

2. The method as recited in claim 1, further comprising the step of: in response to the threshold exceeding or equaling an upper limit, terminating the step of returning to the step of examining.

3. The method as recited in claim 1, further comprising maintaining an incomplete version of an object at a server and maintaining at least one fragment at the server.

4. The method as recited in claim 3, further comprising in response to a request for the object from a client, sending the incomplete version of the object, an identifier for a fragment including the object, and a position for the fragment within the object are sent to the client.

5. The method as recited in claim 4, further comprising after receiving the incomplete version of the object, the identifier, and the position, requesting the fragment by the client from the server using the identifier, and constructing the object by including the fragment in the incomplete version of the object in a location specified by the position.

6. The method as recited in claim 1, further comprising, in response to the threshold not exceeding or equaling an upper limit, increasing the threshold until an object is constructed or time expires.

7. The method as recited in claim 1, wherein using graph traversal techniques includes representing fragments by vertices in a directed graph, and inclusion relationships by directed edges in the graph.

8. The method as recited in claim 7, further comprising traversing a list of inclusion relationships using two pointers wherein a first pointer traverses one fragment at a time, and a second pointer traverses two fragments at a time such that if the two pointers meet in the graph, a cycle has been detected.

9. In a system comprised of a plurality of fragments in which a fragment is includable in another fragment, a computer program product for determining whether a set of inclusion relationships includes a cycle, comprising a computer useable medium including a computer readable program, wherein the computer readable program when executed on a computer causes the computer to perform the steps of:

examining the set of inclusion relationships to determine whether a depth of inclusions exceeds or equals a threshold;

if the depth exceeds or equals the threshold, using graph traversal techniques to determine if a graph comprised of inclusion relationships includes a cycle; and it using the graph traversal techniques, no cycle is determined, incrementing the threshold and returning to the step of examining.

10. The computer program product as recited in claim 9, further comprising the step of in response to the threshold exceeding or equaling an upper limit, terminating the step of returning to the step of examining.

11. The computer program product as recited in claim 9, further comprising maintaining an incomplete version of an object at a server and maintaining at least one fragment at the server.

12. The computer program product as recited in claim 11, further comprising in response to a request for the object from a client, sending the incomplete version of the object, an identifier for a fragment including the object, and a position for the fragment within the object are sent to the client.

13. The computer program product as recited in claim 12, further comprising after receiving the incomplete version of the object, the identifier, and the position, requesting the fragment by the client from the server using the identifier, and constructing the object by including the fragment in the incomplete version of the object in a location specified by the position.

14. The computer program product as recited in claim 9, further comprising, in response to the threshold not exceeding or equaling an upper limit, increasing the threshold until an object is constructed or time expires.

15. The computer program product as recited in claim 9, wherein using graph traversal techniques includes representing fragments by vertices in a directed graph, and inclusion relationships by directed edges in the graph.

16. The computer program product as recited in claim 15, further comprising traversing a list of inclusion relationships using two pointers wherein a first pointer traverses one fragment at a time, and a second pointer traverses two fragments at a time such that if the two pointers meet in the graph, a cycle has been detected.

\* \* \* \* \*